(12) United States Patent
Ilvas et al.

(10) Patent No.: US 8,406,698 B2
(45) Date of Patent: *Mar. 26, 2013

(54) TECHNIQUES FOR DETERMINING A VELOCITY OF A SPORT OBJECT

(75) Inventors: Lauri Ilvas, Vantaa (FI); Anssi Luomaranta, Espoo (FI); Timo Salmi, Vantaa (FI); Tomi Salmi, Vantaa (FI); Miikka Tikander, Helsinki (FI)

(73) Assignee: Entetrainer Oy, Espoo (FI)

( * ) Notice: Subject to any disclaimer, the term of this patent is extended or adjusted under 35 U.S.C. 154(b) by 59 days.

This patent is subject to a terminal disclaimer.

(21) Appl. No.: 12/561,061

(22) Filed: Sep. 16, 2009

(65) Prior Publication Data

US 2010/0069015 A1    Mar. 18, 2010

(30) Foreign Application Priority Data

Sep. 17, 2008  (FI) .................................... 20085876
Jan. 27, 2009  (FI) .................................... 20095072
Jun. 18, 2009  (FI) .................................... 20095700

(51) Int. Cl.
   *H04B 17/00*    (2006.01)
(52) U.S. Cl. ...................... 455/67.11; 73/491
(58) Field of Classification Search .............. 455/67.11; 73/491
   See application file for complete search history.

(56) References Cited

U.S. PATENT DOCUMENTS

| 2,157,572 | A | * | 5/1939 | Roberts | 324/178 |
| 4,801,880 | A | * | 1/1989 | Koike | 324/178 |
| 7,200,513 | B1 | * | 4/2007 | Noh | 702/142 |
| 2007/0177696 | A1 | * | 8/2007 | Chen et al. | 375/341 |
| 2007/0178967 | A1 | | 8/2007 | Rosenberg | |
| 2008/0108456 | A1 | * | 5/2008 | Bonito | 473/409 |
| 2010/0064803 | A1 | * | 3/2010 | Salmi et al. | 73/491 |

FOREIGN PATENT DOCUMENTS

| CN | 87107996 | A | | 6/1988 |
| FR | 2 634 895 | A1 | | 2/1990 |
| FR | 2 862 770 | A1 | | 5/2005 |
| GB | 1038654 | | | 8/1966 |
| GB | 2 198 232 | A | | 6/1988 |
| GB | 2198232 | A | * | 6/1988 |
| JP | 63-98586 | | | 4/1988 |
| JP | 1-162187 | | | 6/1989 |
| JP | 10-10247 | | | 1/1998 |
| JP | 2005-260885 | A | | 9/2005 |
| WO | WO 2007/087645 | A1 | | 8/2007 |
| WO | WO 2007/130057 | | * | 11/2007 |

* cited by examiner

*Primary Examiner* — Hezron E Williams
*Assistant Examiner* — Gregory J Redmann
(74) *Attorney, Agent, or Firm* — Birch, Stewart, Kolasch & Birch, LLP

(57) ABSTRACT

A method for determining a velocity of an object (O), such as a ball, over a span length (SL) extending from a span start (SS) to a span end (SE). An audio signal (AS) is received by a mobile terminal's (MT) microphone (MP). An approximate travel time (TT) for a traversal of the span length (SL) by the object (O) is determined, which act time comprises processing the audio signal (AS) and detecting a first shape (210) and a second shape (212) which respectively correspond to an approximate start time (T1) and approximate end time (T2) of the traversal, and determining the approximate travel time (TT) based on the detected first shape (210) and second shape (212). The object's velocity is determined based on the span length (SL) and approximate travel time (TT). The velocity may be determined by the mobile terminal or by an external server.

15 Claims, 8 Drawing Sheets

TECHNIQUES FOR DETERMINING A VELOCITY OF A SPORT OBJECT

BACKGROUND OF THE INVENTION

The invention relates to techniques for determining velocity of a sport object. A representative but non-restrictive list of exemplary sport objects includes balls, pucks, arrows and comparable items.

In many games, the velocity of sport object is crucial to the athlete's performance, which is why athletes aim at improving the initial velocity, or start velocity, of the sport objects. It is customary to measure the initial velocity of sport object by means of Doppler radar. A problem with this approach is that the Doppler radar is prohibitively expensive to most amateur athletes.

Accordingly, there is a need for simpler equipment for measuring the velocity of a sport object.

BRIEF DESCRIPTION OF THE INVENTION

An object of the invention is to develop techniques for measuring the velocity of a sport object with a simpler and less costly equipment than in conventional methods. The object of the invention is achieved by a method, apparatus and software product as specified in the attached independent claims. The dependent claims as well as the present patent specification and drawing relate to specific embodiments and implementations of the invention.

The invention is partially based on the idea of determining the object's velocity by utilizing a mobile terminal, such as a mobile telephone. Mobile telephones are ubiquitous, yet sophisticated pieces of equipment, many of which support additional program modules which can be used to direct the mobile telephone's processor to perform the necessary processing acts and calculations. The invention is also based on the idea of using the mobile telephone's built-in microphone or some microphone operatively coupled to the mobile telephone to receive an audio signal based on which the start and end times of the sport object's movement can be detected.

As used herein, a mobile telephone means an electronic apparatus which is capable of attaching to a wireless network and carrying out a bidirectional call, which is conveyed via the wireless network, at least for a portion of its distance. For instance, the call may be a voice or data call in a cellular mobile network. Alternatively, the call may be a VoIP (Voice over Internet Protocol) call conveyed over a cellular network or a WLAN (Wireless Local-Area Network). However, those skilled in the art will realize that the ability to participate in a call is not essential for some embodiments of the invention. Rather the invention is applicable to a wide variety of portable data processing equipment, such as palmtop or mini-laptop computers having voice input capability and the required means for bidirectional communication via the wireless network. It is to be expected, however, that the ubiquitous cellular mobile telephone will be the most popular form of wireless terminal for practicing the invention. Accordingly, the term "mobile telephone" is intended to refer to any mobile terminal capable of receiving a voice input via an internal or external microphone and capable of supporting bidirectional communication over the wireless network.

The audio signal is processed into a series of audio samples, each of which has an intensity and duration. The duration is normally the same for all samples. As an alternative to performing all of the processing acts and calculations by the mobile telephone's microprocessor, it is possible to send the processed audio samples via the wireless network to an external velocity calculation server. The server calculates the sport object's velocity and returns the calculated velocity via the wireless network to the mobile telephone that ultimately outputs it to the user. The mobile telephone may output the velocity either visually or audibly, or both. The common inventive idea underlining these two embodiments is that the audio samples are measured by the mobile terminal, the audio samples are conveyed to a velocity calculation unit that computes the initial velocity of the sport object, and the initial velocity is indicated to the user via the mobile terminal's user interface. In some embodiments the velocity calculation unit resides in the mobile terminal itself, while in others it may reside in an external server, The velocity calculation unit may compute the initial velocity by utilizing parameters such as flight time and span length that directly yield an average velocity, and thereafter the velocity calculation unit may apply some empirical and/or calculated correction factor to determine the object's initial velocity.

The span length traversed by the object may be determined by the mobile telephone, by receiving this information from the mobile telephone's user interface, for example. The start and end time plus the span length suffice to provide an approximation for the object's average velocity. As an alternative to an arbitrary selection of span length, it is possible to predefine an optimal span length for any given sport, and instruct the user to position the span start at an appropriate location, such that its separation from the span end equals the predefined optimal span length for the selected sport. In addition, it is possible to maintain several different span lengths for each sport, depending on the users' age, gender, physical strength, or the like. A predefined span length provides the advantage over the arbitrary, user-selected, length that the predefined optimal length makes it easier to compensate for the deceleration of the sport object, and thus to provide a better estimate of the initial velocity.

Most athletes wish to know the object's initial (start) velocity, which can be estimated by applying some correction to the average velocity. Such a correction can be determined empirically, for example by performing a statistically sufficient number of experiments in which the object's average velocity is determined by dividing the span length traversed by the object by the travel time, while the object's initial velocity is determined with some other means, such as Doppler radar. Such a statistically sufficient number of experiments will yield an empirical correction by which the initial velocity can be determined on the basis of average velocity and span length. It is also possible to entirely bypass the determination of the average velocity and generate an empirically determined function or lookup table whose inputs are the span length and travel time and the output of the function or lookup table is the initial velocity.

Based on the preceding description of the invention alone, it would seem that the invention is merely based on performing simply physical calculations by a mobile telephone's processor. Those skilled in the art will realize, however, that implementing the invention requires solutions to several residual problems.

A first residual problem is the fact that in the application programming interface (API) of conventional mobile telephones, it is problematic to determine the time of an event with a resolution which is sufficient for accurate timing of the object's movement. For instance, the resolution of various timers varies between platforms and telephone models. For instance, Symbian® platforms provide universal timer functions with a resolution of one second, which is obviously far too coarse for accurate determination of velocity. As an alternative to the timer functions with a coarse resolution, the Symbian® platforms provide various "tick" functions, wherein the duration of one "tick" depends on the microprocessor's speed. Such "tick" functions are obviously incompatible with a desire to create a platform-independent program for determining velocity. The problem of how to determine time with sufficient resolution in a platform-independent manner can be solved by determining a first set and a second set of audio samples that temporally coincide with the sport object's position at the span start and span end, and determining the object's travel time on the basis of the number and duration of the audio samples between the first set and second set of audio samples. In case the terminal being used is a mobile telephone, the audio samples may be processed by means of the mobile telephone's audio codec. On the other hand, if the mobile terminal is a data processing terminal without inherent voice call capabilities, the processing of the audio signal into appropriate audio samples may be carried out by some voice recording software installed into the mobile terminal.

A second residual problem is the fact that most mobile telephones are not designed for accurate and objective measurement of sound. Nor are they designed for post-processing of measured sound within the mobile telephone. Instead, mobile telephones are designed to take audio samples called "codebook samples" of human speech and transfer the codebook samples via a traffic channel to a base station in a wireless radio network. For example, it is a well-known fact that the audio circuitry of a conventional mobile telephone and the voice coding algorithm of GSM telephones are incapable of reliably trans-mitting DTMF (dual-tone, multi-frequency) sounds, which is why various bypass techniques for conveying DTMF sounds have been developed. Some features and embodiments of the invention aim at solving these residual problems.

Provided that the mobile terminal's processor has sufficient processing power, the audio samples can be captured and processed as a real-time operation. Real-time processing does not have a universally adopted definition, but for the purposes of the present invention and its embodiment, real-time processing of audio samples means that the mobile terminal, including all hardware and firmware involved, such as the processor, system firmware, application programming interface and audio processing circuitry are capable of detecting the first and second shapes that indicate the start and end times of the object movement as fast as the audio samples are captured. Typical mobile terminals built on Symbian® platforms are capable of operating in this mode. A benefit of real-time operation is that there is no need to buffer the audio samples for a longer time that what is required for the detection of the first and second shapes. This means that the audio buffer can be re-used or re-filled in a circular fashion and the mobile terminal, under control of the inventive program module, can wait indefinitely for the first shape that indicates the start time of the object's movement. In other words, the mobile terminal can buffer audio samples only as much as is required for detecting either of the first and second shapes, and then discard the audio samples, for example by re-using the buffer memory area. As far as buffer memory consumption is concerned, the mobile terminal could wait indefinitely for the second shape, ie the one that indicates the end of the object's movement, but it is reasonable to utilize some sanity check which rejects the second shape if it occurs too long after the first shape.

In case the mobile terminal, including hardware and firmware resources, is incapable of real-time operation, an embodiment of the inventive program module may cause the mobile terminal to capture and buffer all the audio samples which include the first and second shapes, and any audio samples in between, prior to detecting the first and second shapes from among the buffered audio samples. A residual problem in such environments is that the captured audio samples must be buffered in a buffer memory, and the memory may be a scarce resource in low-power mobile terminals. The buffer memory requirements can be minimized by providing the user with a signal that indicates the time when the audio buffering begins. In some implementations, the signal can even set up to precede the beginning of audio buffering by a couple of seconds. This is useful in situations like a penalty kick in soccer, wherein the player may run for a couple of second before actually kicking the ball, which results in the first shape to be detected.

BRIEF DESCRIPTION OF THE DRAWINGS

In the following the invention will be described in greater detail by means of specific embodiments with reference to the attached drawings, in which.

DETAILED DESCRIPTION OF SPECIFIC EMBODIMENTS

Figure 1:
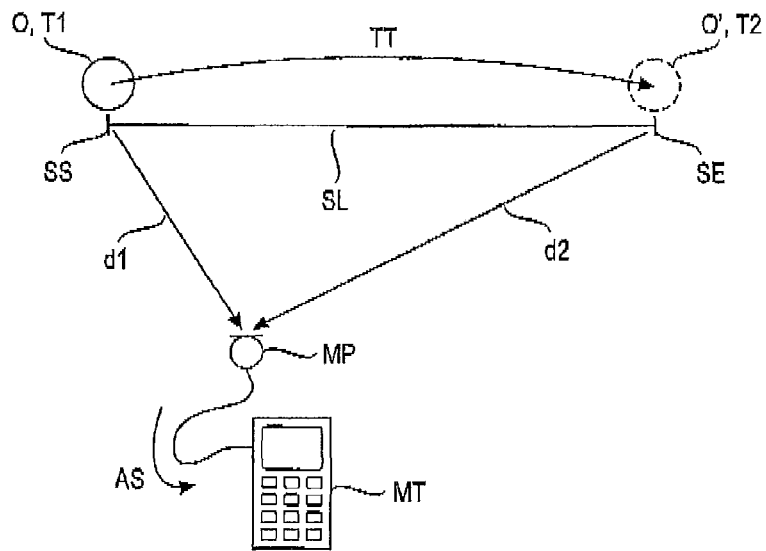
FIG. 1 shows some of the physical quantities involved.

FIG. 1 illustrates some of the physical quantities involved. Reference sign O denotes a sport object, such as ball, puck, arrow or the like. During the velocity measurement the object O will traverse a span length SL from a span start SS to a span end SE. The object O is shown at the span start SS, while a dashed version O' is shown at the span end SE. Reference signs T1 and T2 respectively denote the start and end times of the object's movement from the start position SS to the end position SE. The travel time TT for the object's traversal of the span length SL is determined with a microphone MP, which is operatively coupled to a mobile telephone MT. For example, the microphone MP can be the mobile telephone's built-in microphone or an external microphone coupled to the mobile telephone via a wired or wireless connection. A representative but non-restrictive example of a wireless microphone connection is a Bluetooth connection. Reference sign AS denotes the audio signal outputted by the microphone to the mobile telephone MT. The mobile telephone MT is capable of downloading and executing additional software modules.

The microphone MP is separated from the span start SS and span end by respective distances d1 and d2. If the difference d2−d1 is large and/or the typical velocity of the object is high, it is beneficial to divide d2−d1 by the speed of sound and subtract the quotient from the travel time (whose determination will be described in connection with FIG. 2). A benefit of using a microphone MP which is detached from the mobile telephone MT and coupled to it via a wired or wireless connection is that the microphone can be positioned at the center point of the span length SL or close to the center point, while the mobile telephone MT is operated from a safe position farther away from the fast-moving object O.

In some implementations more than one microphone may be used. For instance, a mobile telephone may support a built-in microphone and another microphone that may be connected via a short-range wireless coupling, such as a Bluetooth coupling. One of the microphones may be positioned near the span start SS, while the other is positioned near the span end SE. Provided that the microphones are placed very close to the span start and span end, the output signals from the microphones need relatively little amplification, which helps to suppress noise.

In some embodiments of the invention, the mobile terminal comprises a velocity-calculation program, as will be described in connection with FIG. 3A. In other embodiments, the mobile terminal may be configured to transmit audio samples derived from the microphone output signal(s) to a velocity-calculation program that resides in an external velocity-calculation server, as will be described in connection with FIG. 3B.

Figure 2:
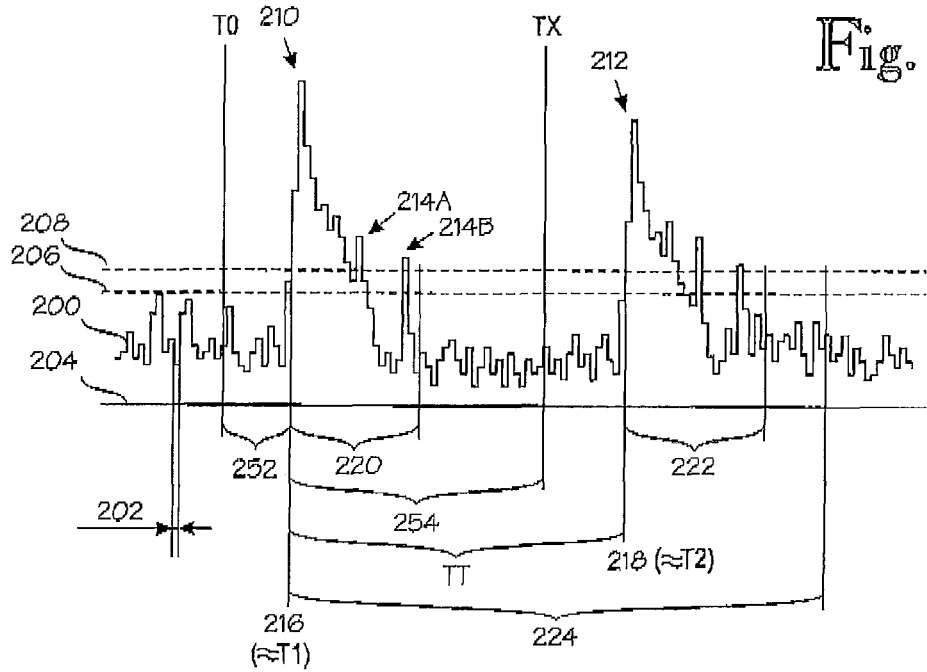
FIG. 2 shows a representative sound profile received by a microphone during a velocity measurement and some related quantities.

FIG. 2 illustrates a representative sound profile 200 which the mobile telephone's processor generates from the audio signal produced by the microphone MP during a velocity measurement. In the embodiment shown in FIG. 2, the sound profile 200 is generated by processing the sound as samples, one of which is denoted by reference numeral 202, and taking the sound intensity of each sample. Thus in a representative implementation the sound profile 200 is the sound intensity as a function of time.

As to the processing of "time" by the mobile terminal, any times discussed herein, such as the start time T1 or end time T2, need not be times on an absolute scale. In other words, the inventive velocity-calculation unit does not have to know the current time. It is rather the relative times that matter. In addition, the relative times need not be measured or expressed in seconds or milliseconds. Indeed, it is very difficult or virtually impossible to generate a platform-independent technique to measure the relative times in milliseconds because there are no platform-independent timer functions. Accordingly, the times and time differences are preferably processed via sample numbers. Each sample has a sample length which is the inverse of the sampling rate.

Reference numeral 204 denotes some reference level, such as 0 dB, but the magnitude of the reference level is insignificant. Reference numeral 206 denotes a noise level such that for a significant proportion of time, the sound profile 200 remains below the noise level 206.

The portion of the sound profile 200 shown in FIG. 2 comprises two major peaks, generally denoted by reference numerals 210 and 212. The first peak 210 is caused by the start of the object's movement (traversal of span length). Depending on the nature of sport and object, the sound may be generated by the athlete kicking a ball, hitting a puck, letting go an arrow, or the like. The second peak 212 is caused by the object hitting a target, such as wall, fence or the like.

The inventive velocity-calculation program being executed by the mobile telephone's processor converts the presence of the peaks 210 and 212 to start and end times, respectively. Firstly, a specific moment of time should be associated with each peak. The peaks 210, 212 are not sharply delineated, however, and the velocity-calculation algorithm or program should be configured to detect shapes within the sound profile 200, such that the shapes are as similar as possible within the two peaks. In one representative but non-restrictive implementation, the time associated with each peak 210, 212 is the time when the sound profile 200 exceeds a predetermined threshold 208 which is above the noise level 206. In the scenario shown in FIG. 2, the first peak 210 is detected by the crossing of the threshold 206 at time 216, while the second peak 212 is detected by the crossing of the threshold 206 at time 218.

In an alternative implementation, the start and end times 216, 218 can be determined based on the presence of the peaks' maximum values. In another alternative implementation, the start and end times 216, 218 can be determined based on times when the sound intensity increases by a predetermined step in a predetermined time window.

Sports in which the object movement is initiated by throwing a ball or other object may require some additional measures because releasing the object from the player's hand does not readily generate an impact sound, which in turn generates the first sound peak 210. Such sports may be handled such that the player throws the ball to the ground or a nearby wall, from which the ball bounces to a second wall. The two impacts generate the two sound peaks 210, 212, and some experimentally derived correction may be applied to yield an estimate of the ball's initial velocity.

The notations 216 (≈T1) and 218 (≈T2) mean that the times denoted by reference numerals 216 and 218 no not precisely coincide with the start and end times T1, T2 of the object movement over the span length SL; rather the times 216 and 218 are the start and end times T1, T2 as measured by the mobile telephone MP under control of the inventive velocity-calculation program. For example, the times 216 and 218 lag the true start and end times T1, T2 at least by the propagation of sound from the start and end positions SS, SE over the distances d1, d2 to the microphone MP. Moreover, as stated above, the inventive velocity-calculation program need not know any of the times shown in FIG. 2 on any absolute scale; it is only the time differences between events that matter, and such time differences can be expressed in sample numbers.

Because the sounds generated at the start and end of the object movements have finite lengths, it is beneficial to employ sleep times 220, 222 such that crossing of the threshold 206 during the sleep times 220, 222 is ignored. The sleep times 220, 222 also help suppress echoes from nearby objects. Reference numerals 214A and 214B denote two such echoes.

Based on the preceding description alone, the inventive velocity-calculation unit cannot distinguish between the object movement's start time and end time. There are various ways to do so. In one implementation, each measurement event is triggered via the mobile telephone's user interface, for example by pressing a key. After the trigger, the first and second peaks which exceed the threshold 208 are considered the start and end of the object's movement, respectively. A problem with this somewhat crude approach is that the athlete or assistant must trigger each measurement event separately.

In a more user-friendly implementation a sliding time window is employed. After any period without detected sound intensity peaks, any detected peak 210 is assumed to correspond to the start time 216 of the object's movement. After that, any intensity development in the sleep time 220 is ignored and the next detected peak 212 is assumed to correspond to the end time 218 of the object's movement. However, a maximum time period 224 from the start time 216 is employed so as to be able to handle cases in which the end of the object movement goes undetected. For instance, the object may miss its intended target and thereby fail to produce a detectable sound. If the maximum time period 224 expires without the detection of the second peak 212 and end time 218, the previously-detected first peak 210 and start time 216 are ignored and the next peak to be detected will be processed as the first peak.

The time difference between the start time 216 and end time 218 may be used as the object's travel time TT. In an enhanced implementation the travel time TT may be corrected to compensate for unequal distances d1, d2 from the span start SS and span end SE to the microphone MP.

Reference signs T0, TX, 252 and 254 relate to optional features that help to reduce the effects of surrounding noise. In some embodiments, the mobile terminal may output a visual and/or audible signal to indicate that the user may set the object in movement. Reference sign T0 denotes the instance of time when this signal is outputted. In soccer, for example, the user may kick the ball. It is beneficial to implement a period of time, denoted by reference numeral 252, during which the sound profile 200 must remain below the threshold level 208. Any noise or other spurious sounds during the time period 252 prevents the velocity calculation program from determining the start time 216 precisely. Thus, reference signs T0 and 252 denote, respectively, the beginning and duration of a period of time during which the sound signal, as measured by the mobile terminal MT, must remain below the threshold level 208. Otherwise the measurement is rejected.

Reference signs TX and 254 relate to another optional feature, which involves setting a minimum time between the start time 216 and end time 218. Reference sign TX denotes an instance of time that follows the start time 216 by an amount of time that equals the span length SL divided by the sport object's maximum velocity. The maximum velocity may be set to value slightly higher than the object velocity attained by the best athletes of the sport in question. In case of soccer, for example, the maximum velocity may be set to about 36 m/s (about 130 km/h). For a span length of 11 m, the time TX occurs about 0.3 seconds after the start time 216. Reference numeral 254 thus denotes a period of time after the start time 216, such that the second detected sound shape 212, such as a crossing of the threshold level 208 by the sound intensity profile 200, must not occur within this period of time. If the sound intensity 200 crosses the threshold level 208 sooner than at time TX, the measurement is rejected. This means that that the sound intensity 200 should remain below the threshold level 208 at least immediately before the time TX, which roughly corresponds to a world record for the object velocity. Otherwise the measurement is rejected. In addition, the velocity-calculation program may employ a criterion according to which the sound intensity 200 must remain below the threshold level 208 after time 220, during which the echoes die out, and before time TX.

Figure 3A:
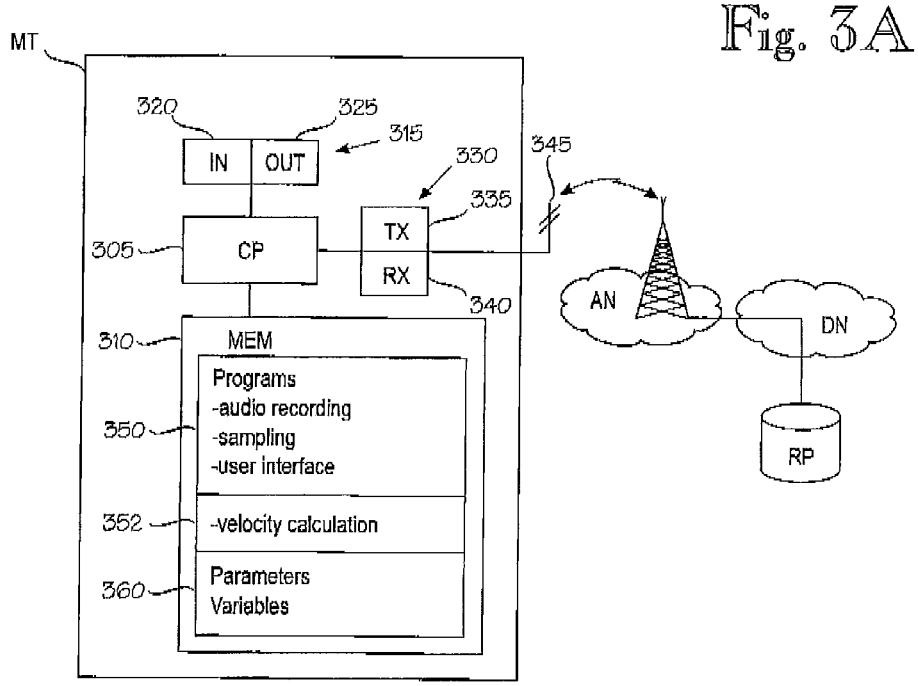
FIG. 3A shows an exemplary system in which the velocity calculation is performed in a velocity calculation program within the mobile terminal.

FIG. 3A is a schematic block diagram of a representative system in which the invention can be used, the system including a mobile terminal MT. The mobile terminal MT comprises a central processing unit CP 305 and memory 310. In addition, the mobile terminal MT comprises or utilizes external input-output circuitry 315 which constitutes the multi-mode terminal's user interface and comprises an input circuitry 320 and an output circuitry 325. The input circuitry 320 comprises the mobile terminal's microphone MP (see FIG. 1) and user-input device, such as a keypad and/or touch screen. The output circuitry 325 comprises the mobile terminal's display and earphone or loudspeaker (not shown separately). The mobile terminal MT further comprises or utilizes reception/transmission circuitry 330 which comprises a transmission circuitry 335, reception circuitry 340 and antenna 345. In order to support installable program modules, the mobile terminal's memory MEM comprises routines for downloading installable program modules and for storing the installable program modules in the memory MEM for execution by the central processing unit CP. FIG. 3 shows an arrangement in which the mobile terminal is configured to download installable program modules from a repository RP via a data network DN, a wireless access network AN, the antenna 345 and reception circuitry 340, although other arrangements are equally possible, such as downloading the installable program modules via a short-range connection, such as Bluetooth or Universal Serial Bus (USB, not shown separately). At this level of generalization, all previously-discussed elements of FIG. 3 can be conventional as used in the relevant art.

In order to solve the problems underlying the present invention, the mobile terminal's memory MEM may provided with a program module 350 which performs the required measurements and calculations. Reference numeral 352 denotes a velocity-calculation program within the program module 350. The program module 350 uses the mobile terminal's memory MEM for storing parameters and variables, collectively denoted by reference numeral 360. Their significance will be described in connection with FIG. 4.

Figure 3B:
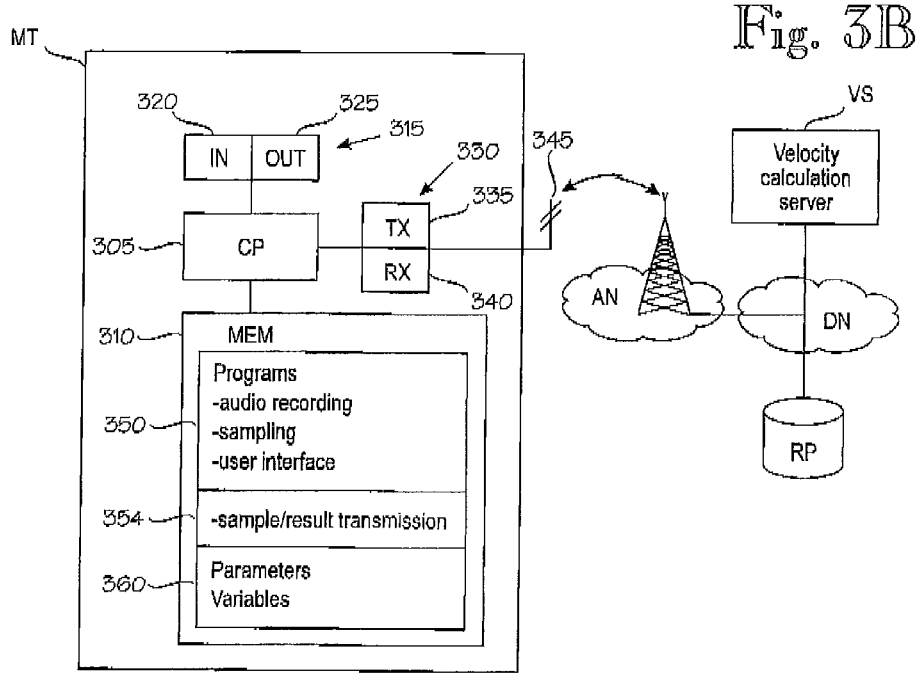
FIG. 3B shows an exemplary system in which the velocity calculation is performed in a velocity calculation server external to the mobile terminal.

As an alternative to performing all of the velocity-related calculations in the mobile terminal MT, it is possible to transmit the audio samples to an external velocity calculation server VS. Such an embodiment is shown in FIG. 3B. As regards hardware, the optional velocity calculation server VS may be a conventional network server which provides information services to mobile subscribers. In order to solve the problems underlying the present invention, the server-based implementation of the invention requires that the server is provided with software for performing the inventive velocity-related calculations. The velocity calculation server VS is configured to serve all the mobile terminals registered to use the service.

Figure 4:
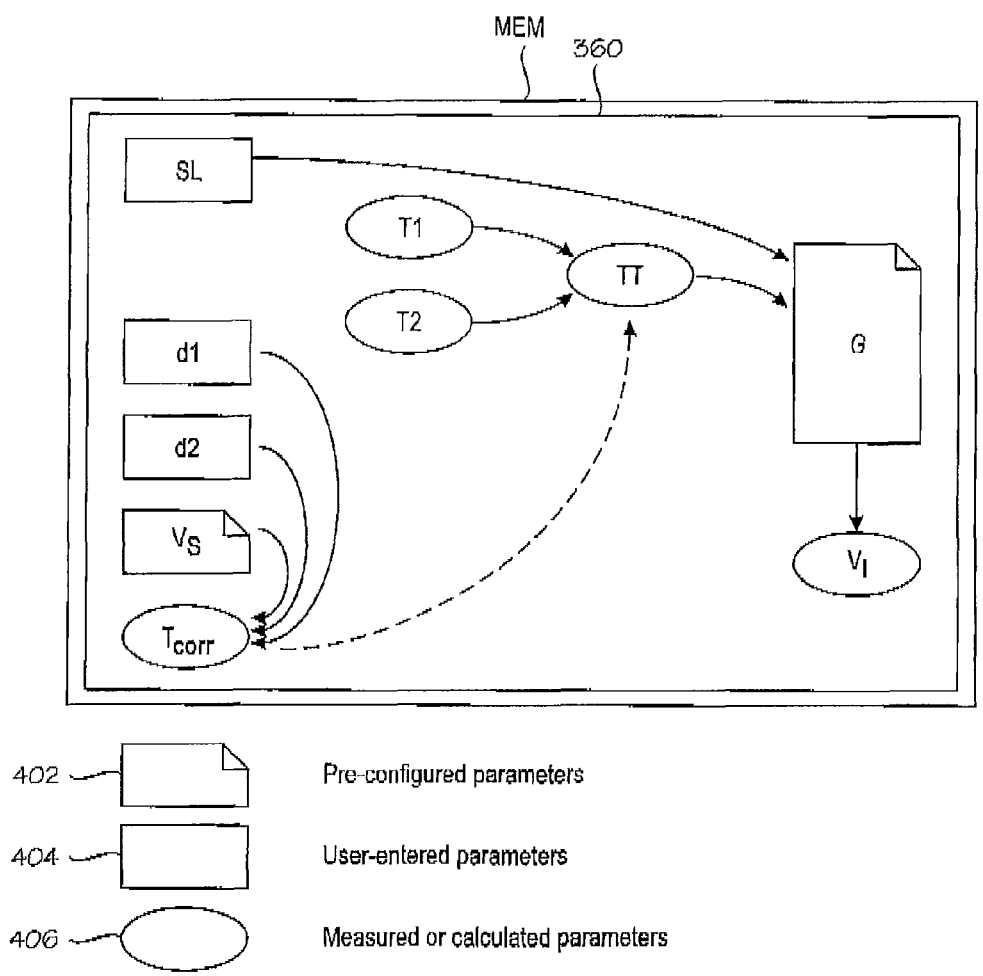
FIG. 4 shows some of the data structures, parameters and variables in the memory of the mobile telephone according to an embodiment of the invention.

FIG. 4 shows some of the data structures, parameters and variables processed by the inventive velocity-calculation program. As shown in FIGS. 3A and 3B, such processing may take place, respectively, in the mobile telephone MT or in the external velocity calculation server VS. Symbols 402 represent pre-configured parameters which can be set up by the programmer of the program module 350. The pre-configured parameters represented by symbols 402 need not be fixed; rather the programmer may set an initial value for them and the mobile terminal user may fine-tune them later. Symbols 404 represent user-entered parameters while symbols 406 represent parameters measured or calculated by the mobile terminal under control of the program 350.

In one exemplary implementation, the only user-entered parameter is the span length SL, ie the span from the object's initial position to the target. As an alternative to making the span length user-settable, it is possible to instruct the users to implement a predefined span length. The program 350 detects the sound peaks corresponding to the start time T1 and end time T2 of the object's movement over the span length. As stated earlier, in connection with FIG. 2, it is not necessary to determine the times T1, T2 on any absolute scale, so long as the sound peaks are detected and the duration between them in any explicit or implicit units of time, such as milliseconds or sample periods. Based on the time difference T2–T1 the program 350 determines the object's travel time TT over the span length SL.

In an enhanced implementation the program 350 may query the user for the distances d1, d2 from the span start SS and span end SE to the microphone MP. Alternatively the program 350 may query the user for the difference d2–d1. The difference d2–d1 divided by the speed of sound $V_S$ yields a time correction $T_{corr}$ which can be subtracted from the difference T2–T1 to obtain a more accurate value for the object's travel time TT.

The span length SL and the travel time TT are applied to a function, routine or lookup table denoted by G. In the following description, the term "function" will mean any data structure which accepts at least one input value and outputs at least one predetermined output value based on the at least one input value. Accordingly, the element G this element will be called function G although, in terms of programming, it can be implemented as calculation (sub)routine, lookup table or any comparable data structure. The input values for the function G include the span length SL and the travel time TT, and the output values include the object's velocity. In the implementation shown in FIG. 4, the reference sign $V_I$ denotes the object's initial velocity. The initial velocity $V_I$ can be calculated by calculating the object's average velocity SL/TT and applying an appropriate correction. As stated earlier, such a correction can be determined empirically, for example by performing a statistically sufficient number of experiments in which the object's average velocity is determined by dividing the span length traversed by the object by the travel time, while the object's initial velocity is determined with some other means, such as Doppler radar. Such a statistically sufficient number of experiments will yield an empirical correction by which the initial velocity can be determined on the basis of average velocity and/or its underlying parameters span length SL and travel time TT. Alternatively, it is possible to model the object's flight by conventional physics and calculate appropriate corrections for determining the initial velocity on the basis of the average velocity. The two most important factor for such physical modelling are the object's air resistance and weight, as these determine the object's deceleration rate.

Regardless of whether the correction from average velocity to initial velocity is determined empirically or by physical modelling, it is also possible to implement the program 350 such that it entirely bypasses the determination of the average velocity and employs such an empirically-determined or physically-modelled function G whose inputs are the span length SL and travel time TT and the output of the function is the initial velocity $V_I$.

Figure 5:
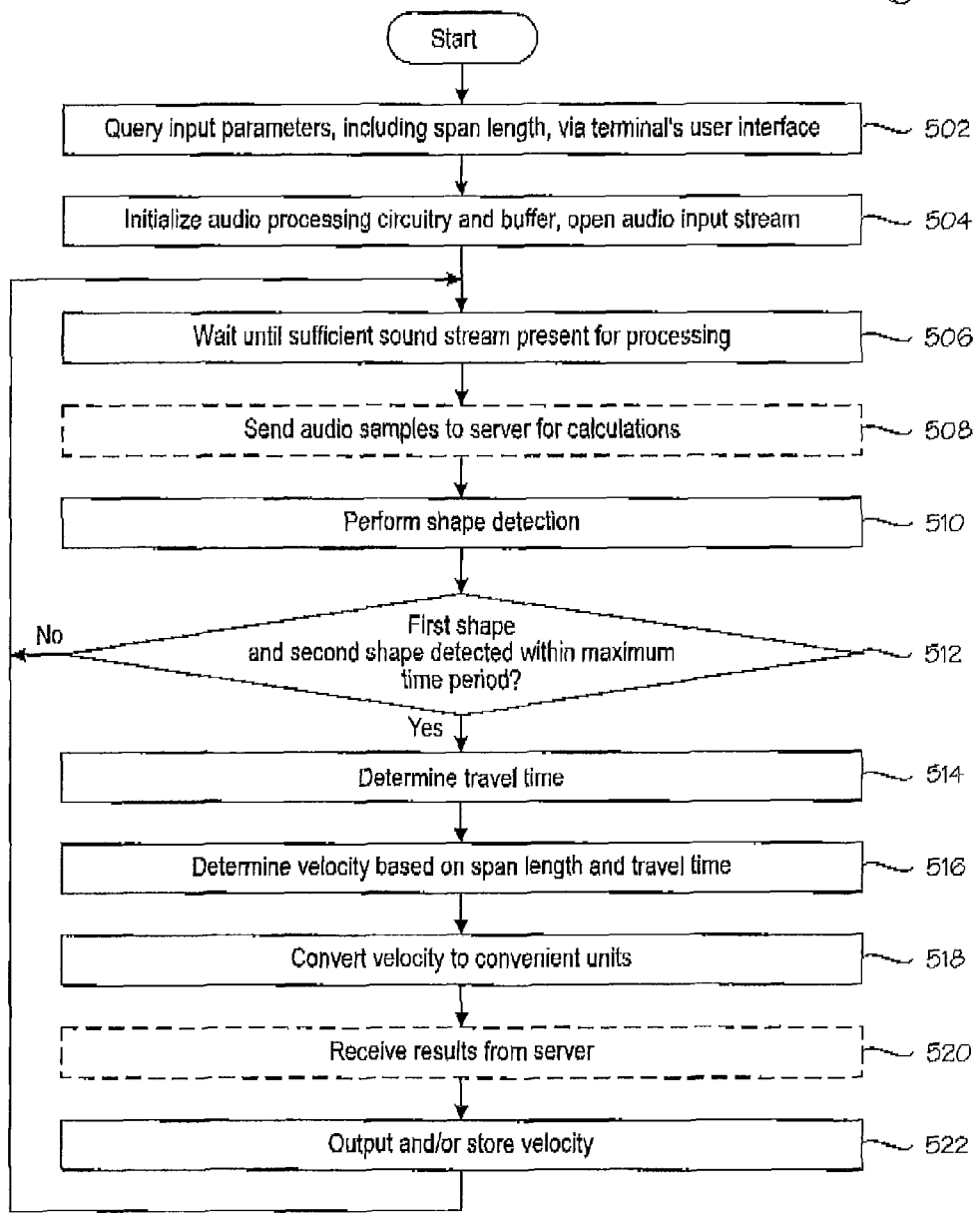
FIG. 5 shows an operating principle of the invention.

FIG. 5 illustrates an operating principle of the invention. In the embodiment shown in FIG. 3A, all acts shown in FIG. 5 are performed by the mobile terminal MT under control of the inventive program modules 350, 352. In other embodiments, some of the acts are performed in an external velocity calculation server (item VS in FIG. 3B). In step 502 the program module 350 causes the mobile terminal to query the input parameters, including at least the span length SL, via the terminal's user interface. For instance, the user may be prompted to key in the span length. Alternatively, the user may be instructed to implement a predefined span length or select one of several predefined span lengths. For instance, the span length may depend on the user's age, gender, and/or past performance. In addition, the user may be prompted to enter the distances d1, d2 from the span start SS and span end SE to the microphone MP, or only the difference d2–d1. In a slightly simpler implementation, the user may be prompted to select one of several options, which may indicate whether the microphone is close to the span start, span end or equidistant from them. In step 504 the program module 350 causes the mobile terminal to initialize its audio processing circuitry and buffer, and to open an audio input stream. Steps 502 and 504 are initialization steps that need not be repeated for each measurement. In step 506 the mobile terminal waits until the buffer holds sufficient audio stream data for processing. Acts 508 and 520, which are shown in a dashed outline, are performed in embodiments wherein the velocity-related calculations, namely acts 510 to 518, are performed in an external velocity calculation server (item VS in FIG. 3B). In the server-based embodiments, step 508 comprises sending the audio samples from the mobile terminal to the velocity calculation server, under control of the program 350. Steps 510 to 518 may be performed in either the mobile terminal or the server VS. In step 510 a shape detection function is performed on the buffered (and sampled) audio stream. As stated in connection with FIG. 2, the shapes to be detected may comprise crossing of a predetermined sound intensity level, a sharp rise in intensity (sufficient slope and magnitude), or the like. Step 512 comprises a check as to whether the first shape and second shape are detected within the maximum time period. If not, either the start or end of the object's traversal has gone undetected and the process returns to step 506. If the first shape and second shape are properly detected, the objects' travel time TT is determined in step 514. Step 516 comprises determining the object's velocity on the basis of span length SL and travel time TT. The velocity-determination program may employ various noise-suppression techniques, as stated in connection with FIG. 2. Various corrections may also be performed, as stated in connection with FIG. 4. In step 518 the determined velocity is converted to convenient units. For example, the audio processing under control of the program module 350 may use a sample duration (inverse of sampling rate) as a unit of time, and the sample duration should be converted to seconds for a more user-friendly output. In addition, the user may be prompted to enter the span length in metres or feet, while the program module 350 may be configured to output the velocity in kilometres or miles per hour. In the server-based embodiments, step 520 comprises sending the results from the server to the mobile terminal. In step 522 the velocity is outputted by the mobile terminal visually and/or audibly. Additionally the velocity may be stored in the mobile terminal's memory.

In order to eliminate a need for the mobile terminal user to read the determined object velocity for each attempt, the mobile terminal may maintain a top-n list of velocities, wherein "n" stands for some convenient number of best scores, such as a number from 1 to 20. The top-n list may be maintained separately for each sport and user. In case the object velocity just determined exceeds the previous record, the mobile terminal may produce some audible and/or visible alert, such as a recognizable tone or flashing of its display. The user may be given an opportunity to accept or reject the new record or a new entry into the top-n list. For instance, new records or top-n entries may be rejected in situations wherein a spurious sound has been detected as one of the shapes 210, 212 corresponding to the start and end times T1, T2 of the object's traversal of the span length SL. Alternatively, the new records or top-n entries may be rejected in situations wherein some of the operating parameters have been entered incorrectly.

The flow chart shown in FIG. 5 looks like an endless loop, but in practice the loop may be terminated via system functions provided by the mobile terminal's operating system, for example in response to detection of a pressed "stop" key in the mobile terminal's keypad.

Figure 6:
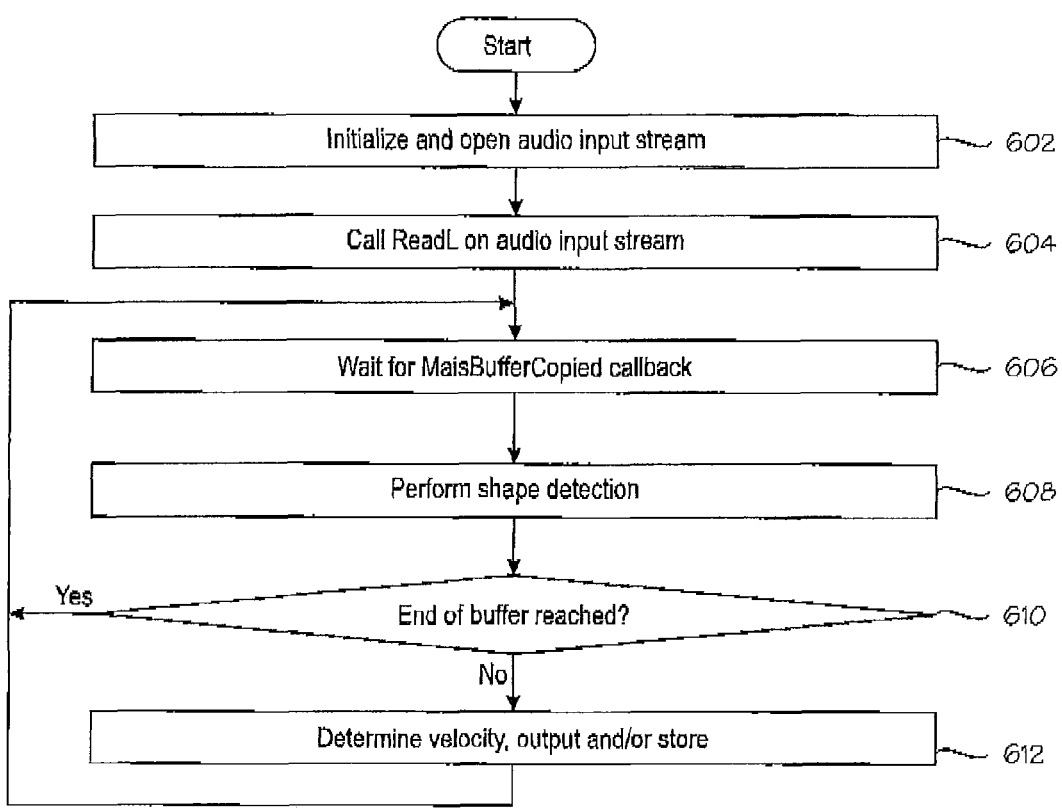
FIG. 6 is a flowchart which illustrates an embodiment specifically adapted for Symbian-based platforms.

FIG. 6 is a flowchart which illustrates an embodiment specifically adapted for Symbian® platforms. Accordingly, the flowchart shown in FIG. 6 is applicable to embodiments in which the velocity-related calculations are performed by mobile terminals. Step 602 comprises initializing an audio input stream and opening it. Symbian class CMdaAudioInputStream can be used for this purpose. The initialization comprises setting up a buffer for the audio input stream. Step 604 comprises calling ReadL function on the audio input stream. Step 606 comprises waiting for MaiscBufferCopied callback function (that follows calling ReadL function of CmdaAudioInputStream). This callback function indicates that the audio input buffer holds sufficient data for processing. Step 608 comprises performing shape detection, which can be performed similarly to step 510 of FIG. 5. Step 610 comprises checking whether the end of the audio input buffer was reached in the shape detection process. Reaching the end of the audio input buffer was reached means that either the first shape 210 or second shape 212 (see FIG. 2) was not properly detected, in which case the process returns to step 606. If the shape-detection process was completed without reaching the end of the audio input buffer, this means that the first shape 210 and second shape 212 were properly detected, in which case the process continues to step 612, in which the velocity is determined and the determined velocity is outputted and/or stored. Step 612 of FIG. 6 corresponds to steps 514 through 522 of FIG. 5.

Figure 7:
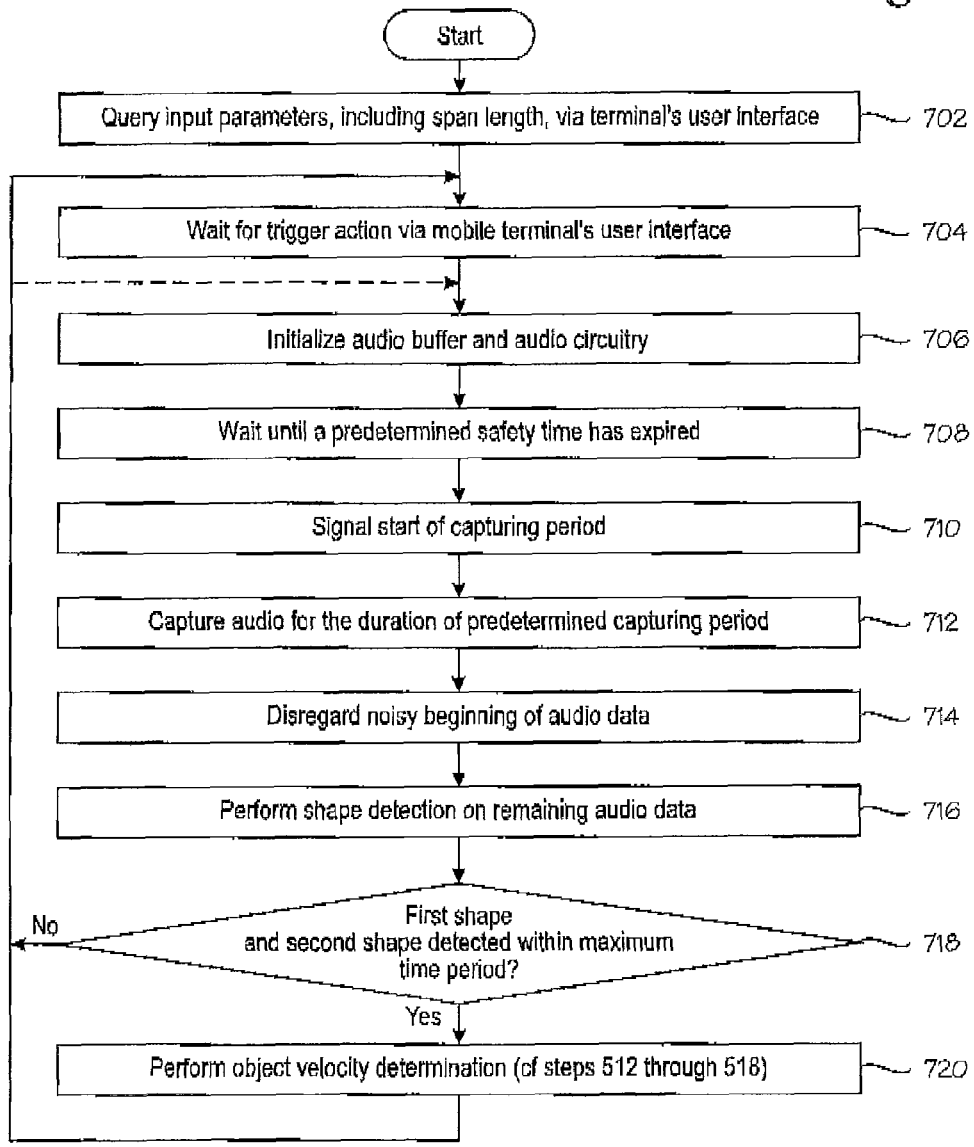
FIG. 7 is a flowchart which illustrates an embodiment specifically adapted for Java-based platforms.

FIG. 7 is a flowchart which illustrates an embodiment specifically adapted for Java-based platforms. The generic flowchart shown in FIG. 5 may not be readily realizable on mobile terminals having low-power microprocessors. A residual problem in connection with such mobile terminals is that the low-power microprocessors lack sufficient processing power to perform the shape-detection process (see FIG. 2 and steps 506 and 510 in FIG. 5) in real time. The flowchart shown in FIG. 7 solves that residual problem by merely capturing audio samples in real time for a predetermined period of time, and performing the shape detection on the audio samples after the capturing process. The flowchart of FIG. 7 can be implemented by installing an appropriate Java applet (or "midlet") into the mobile terminal's memory. Alternatively, the mobile terminal may be configured to send the audio samples to an external velocity calculation server for processing.

The flowchart for Java-based platforms, as shown in FIG. 7, shares several steps with the flowchart shown and described in connection with FIG. 5, and such steps will not be described again. Specifically, steps 502 to 510 of the flowchart of FIG. 5 are replaced by steps 702 through 716, after which the process is similar to the one defined by steps 512 through 522 of FIG. 5. The flowchart begins with a parameter-querying step 702, which is similar to step 502 and will not be described again. In step 704, the mobile terminal, under control of the Java applet, waits for some trigger action via the mobile terminal's user interface. For example, the trigger action may be a key press or the utterance of sound exceeding a predetermined intensity threshold. In step 706 the mobile terminal initializes its audio buffer and audio processing circuitry. The trigger action also triggers a short wait period, step 708, during which the user can move to a safe distance from the mobile terminal. This is useful in situations wherein the mobile terminal is left to monitor a hard, heavy or fast object, such as a tennis ball or ice hockey puck. After the expiry of the safe time, the mobile terminal signals the start of the audio capturing period in step 710. For example, the mobile terminal may output a sound and/or flash a light on its display, to indicate the start of the audio capturing period. In step 712 the mobile terminal captures audio data for the duration of a predetermined capturing period.

As stated earlier, the application programming interface (API) of mobile terminals may not offer programming functions for measuring time with sufficient accuracy. Accordingly, time-related quantities, such as the length of the audio capturing period, may be determined indirectly. For instance, the inventive Java applet may direct the mobile terminal's processor to capture a predetermined number of audio samples. Alternatively, an appropriate maximum length may be assigned to the capture buffer, wherein the maximum length may be defined as the number of audio samples that the capture buffer can hold. An overflow condition of the capture buffer may then indicate of the expiry of the audio capturing period.

Execution of step 714 involves an operation which solves another residual problem of typical mobile terminals, namely the fact that the beginning of the capture buffer, ie, a few first audio samples, are frequently noisy. This phenomenon may be caused by a finite settling time of the various components of the audio processing circuitry. For instance, if automatic gain control (AGC) is being utilized, the AGC circuitry may need some time to settle. Accordingly, the noisy beginning of the audio capture buffer should be ignored and the shape detection operation in step 716 should only be performed on the relatively noiseless part of the audio capture buffer. In one implementation, the Java applet may automatically determine an appropriate length of time (number of audio samples) that should be ignored, by requesting the user of the mobile terminal to place the mobile terminal into a quiet location, after which the Java applet captures that relative silence and detects the number of noisy audio samples in the beginning of the buffer. As this is a terminal-specific calibration operation, it only has to be performed once for each terminal (or terminal type) and stored as one of the operating parameters (see item 360 in FIG. 3). The shape detection process in step 716 is very similar to the one described in connection with FIG. 5 (step 510), and a detailed description is omitted. There are two differences between step 716 of FIG. 7 and step 510 of FIG. 5. One difference is that the shape-detection operation of step 716 is performed on a captured and buffered (temporarily stored) set of audio samples, while the operation of step 510 is performed on a real-time audio stream. This means that, at least in theory, the process described in connection with FIG. 5 can wait indefinitely for the first shape (item 210 in FIG. 2) that corresponds to the start of the object's movement, and the detection of the second shape (item 212) can trigger the termination of the capturing process. In contrast, the process described in connection with FIG. 7 must capture audio samples for the whole length of the capture buffer and only afterwards search the capture buffer for the occurrence of the first and second shapes 210, 212 that respectively correspond to the start and end times T1, T2, of the object's traversal of the span length SL. The other difference between the shape-detection operations of FIGS. 5 and 7 is that step 716 of FIG. 716 should disregard the noisy beginning of the capture buffer.

FIG. 7 shows a partial flowchart because after step 716, the process can be continued similarly to the process shown in FIG. 5, such that step 716 is followed by a test 718 and a velocity-determination process 720. The test 718 may be similar to the test 512 described in connection with FIG. 5, while the velocity-determination process 720 may be similar to the sequence of steps 514 through 522. For a detailed description of these steps, a reference is made to the description of the corresponding steps in FIG. 5.

FIG. 7 shows a version of the flowchart in which each velocity-determination process is followed by a return to step 704 in which the mobile terminal waits for a separate trigger action via the mobile terminal's user interface. Alternatively, the return can be made to step 706, as indicated by the dashed line immediately above step 706. In this case the inventive applet causes the mobile terminal to operate in a continuous mode in which each velocity-determination process is automatically followed by the next, without any explicit trigger action via the user interface. The choice between the single action mode (return to step 704) or continuous action mode (return to step 706) can be requested via the mobile terminal's user interface as part of step 702.

Figure 8:
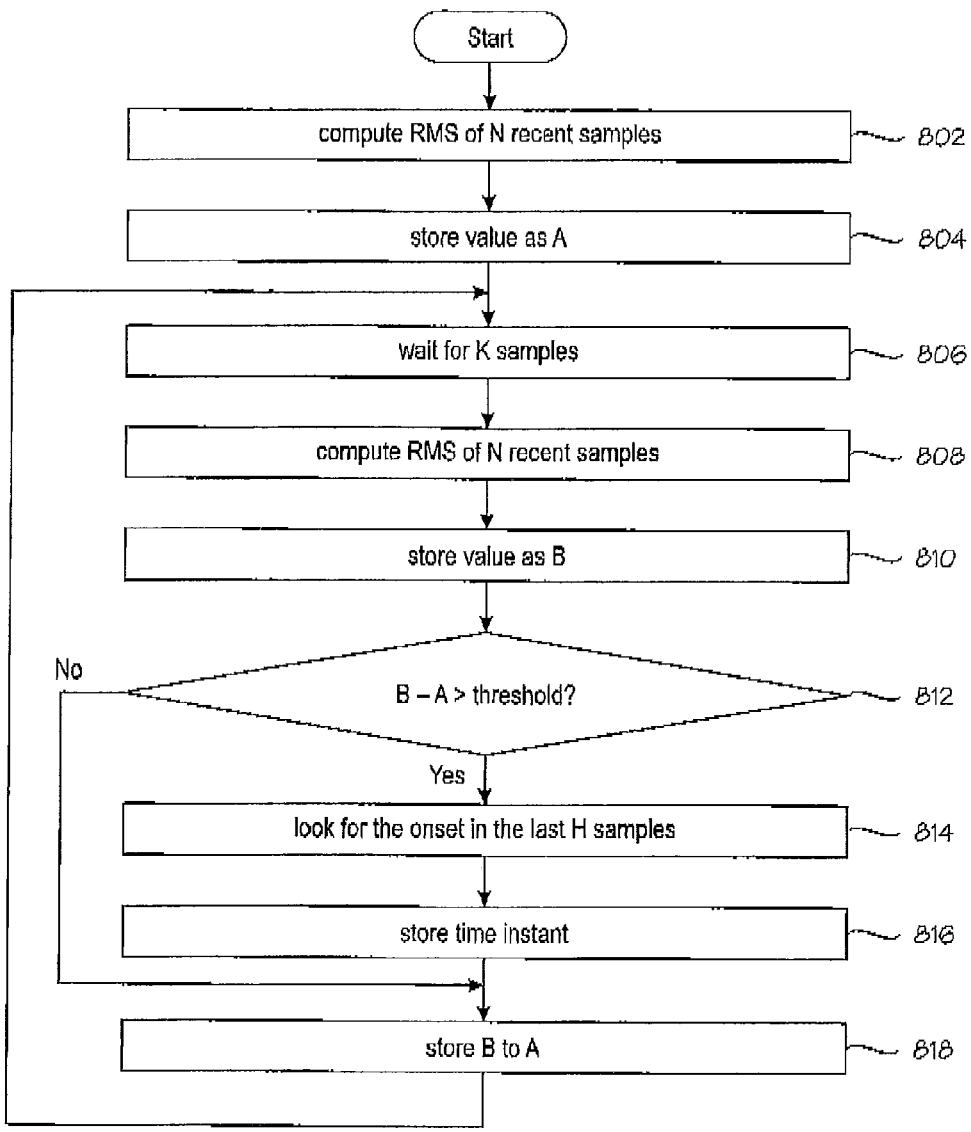
FIG. 8 is a flowchart illustrating an enhanced shape detection algorithm that provides improved robustness against background noise.

FIG. 8 is a flowchart illustrating an enhanced shape detection algorithm that provides improved robustness against background noise. The algorithm may be performed by the mobile terminal MT or the velocity calculation server VS, as required. In connection with FIG. 8, the element carrying out the shape detection algorithm will be referred to as a data processor. First, in step 802, the data processor computes a root-mean-square value of N recent samples. These N samples constitute a sliding time window of samples. In step 804 the RMS value is stored as A. In step 806 the data processor waits for K samples, wherein the K samples constitute an overlap between two time windows. In steps 808 and 810 the data processor computes the RMS value of the current window of N samples and stores the RMS value B. Step 812 is a test as to whether the difference B−A exceeds a predefined threshold value. If not, the process skips the two next steps and proceeds to step 818. On the other hand, if the difference B−A exceeds the predefined threshold value, the data processor determines that a hit has occurred, that is, a valid shape that temporally coincides with the start time T1 or end time T2 of the object's traversal of the span length SL (see FIG. 1). Next, in step 814, the data processor searches for an onset of the audio signal within H last samples, wherein the number H may be N+K, for example. In other words, the processor searches for an onset of the audio signal within the past samples that include the current overlap K and a window length N. In step 816 the instant of time, that is the ordinal number of the sample corresponding to the onset of the signal, when converted to units of time, is stored as the time when the first shape or second shape occurred (cf. items 210, 212 in FIG. 2).

A benefit of the algorithm described herein is that any constant level of background noise is ignored, provided that the background noise remains below the intensity of the audio signal at the start and end of the traversal over the span length.

Provided that the background noise remains below the intensity of the audio signal, an adaptive threshold may be determined by the following algorithm: first compute the RMS value over a signal buffer that includes both the start and end of the traversal of the span length. An optimal threshold level resides somewhere between the maximum intensity value (which corresponds to the start or end of the object traversal) and the RMS calculated over the signal buffer. For example, the threshold may be set to halfway between two extreme levels, one of which represents an average RMS value calculated over a few recent buffers, while the other is an average RMS value of a few maxima detected within the few recent buffers.

Those skilled in the art will realize that functions like average or RMS need not be construed in a strictly mathematical sense. Average values or RMS values are elegant mathematical concepts, but many approximations of these concepts can be substituted for the mathematically accurate values. Indeed, the algorithm described herein can be generalized by stating that the detection of the first shape and/or second shape, which temporally coincide with the start and end of the object's traversal over the span length, comprises maintaining two sliding windows which partially overlap one another. The presence of the first shape and/or second shape within the partially overlapping windows is indicated by determining that $f_A(INT)$ over one of the sliding windows exceeds $f_B(INT)$ over the other sliding window by a predefined margin. Herein INT represents the audio signal's intensity or its derivative, such as the RMS function employed in the algorithm shown in FIG. 8, while f stands for any statistically representative function, such as average, mean, percentile, or the like. The detection is completed by searching for an onset of the audio signal within the at least two partially overlapping windows.

Figure 9:
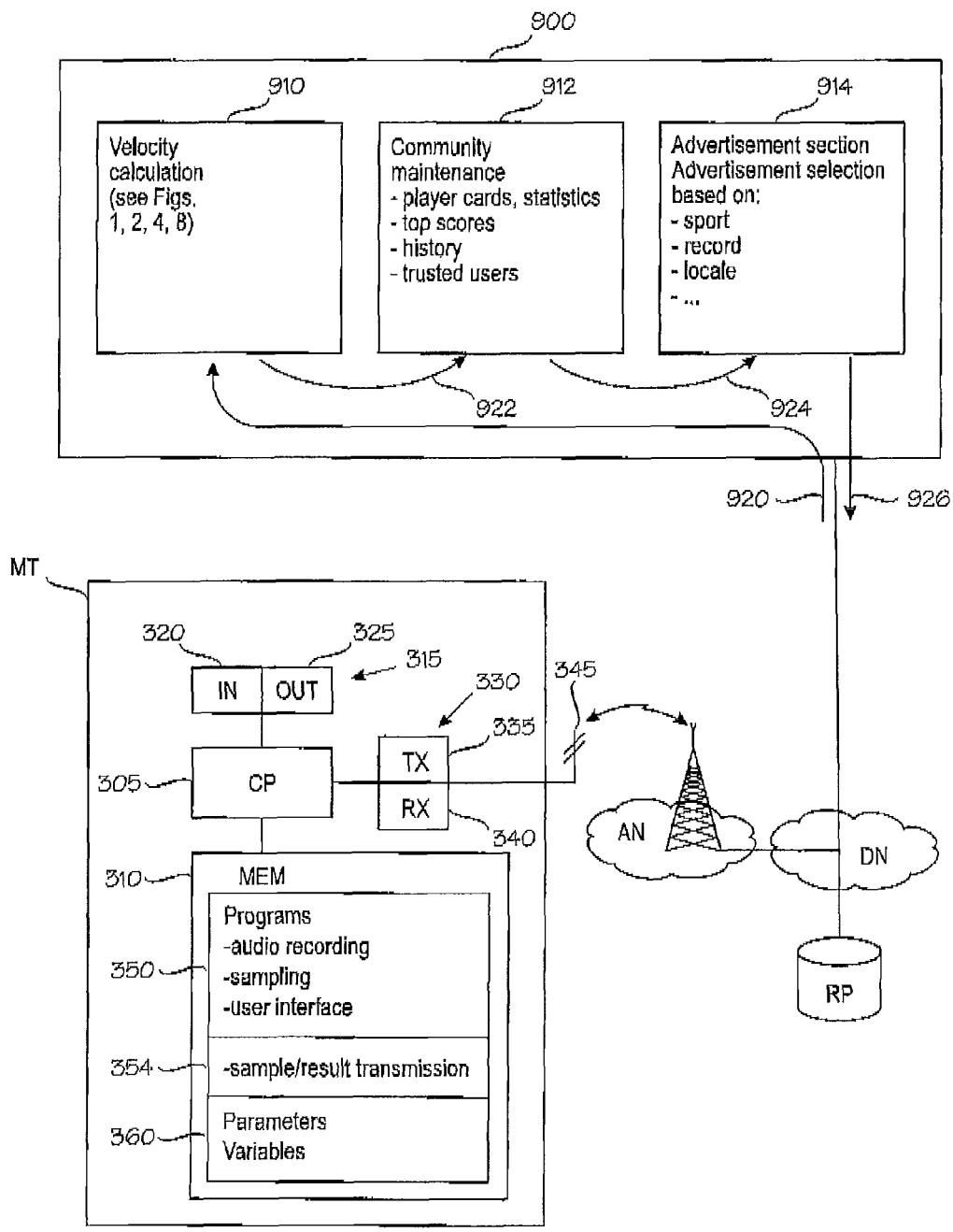
FIG. 9 shows an embodiment in which the velocity calculation server is provided with additional logic sections that provide additional functionality.

FIG. 9 shows an embodiment in which the velocity calculation server is provided with additional logic sections that provide additional functionality. Reference numeral 900 denotes a server system configured to provide such additional functionality. In order to support a large number of mobile terminals and users, the server system ideally comprises a plurality of processors, a fast database system and load-sharing system (not shown separately). The server system 900 comprises several logic sections. One of these, denoted by reference numeral 910, performs the velocity calculation at least for those mobile terminals that lack sufficient processing power for performing the calculations. The velocity calculation section 910 generally corresponds to the velocity calculation server VS shown in FIG. 3B, and it performs the calculations, or some of the calculations, described in connection with FIGS. 1, 2, 4 and 8.

The server system 900 is dimensioned such that it is capable of serving a large number of mobile terminal MT and their users. The users may become members of one or more communities. For instance, soccer players may be registered as members of a soccer community, tennis players may be registered as members of a tennis community, and so on. Players within a country or region may form sub-communities. As used herein, "player" or "member" is largely interchangeable with a "mobile terminal user", but "player" also implies that the person is a member of a community within the meaning of the present embodiment.

A community maintenance section 912 keeps track of the players (mobile terminal users as members of a specific community). The community maintenance section 912 may allocate a virtual player card for each registered player. The players may register via their mobile terminals MT and/or via Internet browsers (not shown separately). A player's registration process establishes a membership of a community as well as an identity and password for the player/member. The identity and password are required for further log-in procedures. The community maintenance section 912 keeps track of each player's top scores and, optionally, their history.

In an advantageous implementation, the server system 900 assigns a trusted user status to some players. For instance, the community maintenance section 912 may keep track of trusted users. A trusted user status is required to report or confirm a score that may qualify as "official". Without confirmation by a trusted user, any player's mobile terminal can relay scores or sound samples that yield the scores, but such scores lack an official status. This means that the scores may be entered, stored in the user's history log and shown to the other members of the community, but it is up to the other members to decide how reliable the scores are. Reports confirmed by trusted users have an official status, and other community members may find it easier to believe that the scores in question were made under comparable conditions. In other words, the logic sections relating to the trusted users alleviates the technical problem that scores (velocities) attained by the players may be made in conditions that are not comparable.

There may be a hierarchy of trusted users and official status levels. For instance, a lowest level of trust may be earned by being a community member long enough and/or by earning the support of a certain number of community members, whereas the topmost level of trust may require certification from a nation-wide organization of the sport in question. In one implementation, the trusted users may confirm scores in the following manner. The velocity calculation logic 910 calculates the velocity for a player's performance and reports It to the community maintenance section 912 for record-keeping. The community maintenance section 912 detects that the velocity is such that it merits an entry in one or more logs. At this point the community maintenance section 912 may send the mobile terminal MT a request to confirm that score. The trusted user may confirm the score with their user identity and password. If the community maintenance section 912 receives the confirmation via the trusted user's identity and password, the score is recorded as official. Otherwise it is recorded as unofficial. In an alternative implementation, the trusted user status is linked to the identity of the trusted user's mobile terminal or mobile subscription. An IMEI or IMSI (International Mobile Equipment Identity, International Mobile Subscriber Identity) code may be used for this purpose. A multi-level hierarchy of trusted users and official status levels may be employed in connection with different result-confirmation techniques. For instance, merely utilizing a trusted user's mobile terminal to enter a score may suffice for a low level of trust, whereas the top level of trust may require a separate authentication via password.

An advertisement section 914 may be employed to make the upkeep of the server system 900 financially viable. For example, the advertisement section 914 may be responsive to an indication of a new score of a player, or to a general improvement in the player's score history. The advertisement section 914 may respond to an indication of a players new score by advertising equipment that correspond to the player's new performance level. The operator of the server system 900 may finance the upkeep of the system by charging advertisers for each delivered advertisement.

Technically speaking, the various sections of the server system 900 may cooperate as follows. Reference numeral 920 denotes a set of audio samples from the mobile terminal MT, and more specifically, from the program 354 configured to transmit the recorded audio samples to the server system 900. The audio samples are conveyed to the velocity calculation section 910, which calculates the velocity and reports it to the community maintenance section 912. Such reporting is indicated by arrow 922. The community maintenance section 912 may detect that the score is a good score or top score for the player and report the fact to the advertisement section 914, as indicated by arrow 924. The advertisement section 914 may select an advertisement which is relevant for the sport and score, and sends the selected advertisement, as indicated by arrow 926. In addition to the advertisement selected by the advertisement section 914, the velocity calculation section 910 reports the player's actual score to the player, and community maintenance section 912 may report the player's progress, statistics or some other useful information.

In cases wherein the player's mobile terminal has an associated position-determination device, such as a GPS system, the mobile terminal's position may be conveyed to the server system 900. The server system 900 can use the player's position in several ways. In some implementations, the server system 900 may use the player's position and a three-dimensional map to determine the player's elevation above sea level. The elevation, in turn, corresponds to air pressure that may be used to derive an appropriate correction for determining the initial velocity from data (span length and travel time) that directly yield an average velocity. Additionally or alternatively, the server system may record the position of the player's score and/or select advertisements on the basis of the player's current position.

It is readily apparent to a person skilled in the art that, as the technology advances, the inventive concept can be implemented in various ways. The invention and its embodiments are not limited to the examples described above but may vary within the scope of the claims.

The invention claimed is:

1. A method for determining a velocity of an object, comprising:
    receiving an audio signal by at least one microphone operatively coupled to a mobile terminal, wherein the mobile terminal is attached to a wireless network;
    processing the received audio signal, wherein the processing of the audio signal comprises converting the audio signal to a series of digital audio samples each of which has a predetermined intensity value and duration, and conveying the series of digital audio samples to a velocity calculation unit;
    performing the following steps by the velocity calculation unit:
    determining a span length to be traversed by the object, wherein the span length extends from a span start to a span end;
    determining an approximate travel time for a traversal of the span length from the span start to the span end by the object, wherein the determination of the approximate travel time comprises:
        processing the series of digital audio samples and detecting a first shape and a second shape which respectively correspond to an approximate start time and approximate end time of the traversal;
        wherein the detection of the first shape and/or second shape comprises detecting a digital audio sample whose intensity exceeds a predetermined threshold or a group of consecutive digital audio samples wherein the group's last digital audio sample has an intensity which exceeds the intensity of the group's first digital audio sample by a predetermined margin;
        determining the approximate travel time by determining a combined duration of the digital audio samples between the detected first shape and second shape, wherein the determination of the approximate travel time comprises determining the number and duration of digital audio samples between the detected first shape and second shape;
    determining the velocity of the object based on the span length and approximate travel time; and
    conveying information on the velocity of the object from the velocity calculation unit to a user interface of the mobile terminal; and
    outputting the velocity of the object via the user interface of the mobile terminal.

2. A method according to claim 1, wherein the determination of the velocity comprises determining an average velocity and applying a correction to the average velocity to determine an initial velocity.

3. A method according to claim 1, wherein the determination of the velocity comprises determining an initial velocity by applying the span length and travel time to a function or lookup table.

4. A method according to claim 1, wherein the determination of the travel time comprises compensating for unequal distances of the microphone from the span start and span end.

5. A method according to claim 1, wherein the detection of the first shape and/or second shape comprises:
   maintaining at least two sliding windows A and B which partially overlap one another;
   detecting a presence of the first shape and/or second shape within the at least two partially overlapping windows by determining that fA(INT) over one of the sliding windows exceeds fB(INT) over the other sliding window by a predefined margin, wherein INT represents the audio signal's intensity or its derivative, while f stands for a statistically representative function; and
   searching for an onset of the audio signal within the at least two partially overlapping windows.

6. A method according to claim 1, further comprising skipping a predetermined number of samples or milliseconds after the detected first shape and/or second shape before detecting a subsequent shape.

7. A method according to claim 1, further comprising rejecting the series of digital audio samples if the combined duration of the digital audio samples between the detected first shape and second shape is lower than a predetermined minimum time.

8. A method according to claim 1, wherein the step of detecting a first shape and a second shape which respectively correspond to an approximate start time and approximate end time of the traversal further comprises detecting the first shape and the second shape among the series of digital audio samples.

9. A system, comprising a mobile terminal and a velocity calculation unit, wherein the mobile terminal comprises:
   an attaching device configured to attach to a wireless network; and
   a memory storing a software program product, wherein execution of the software program product in the mobile terminal causes the mobile terminal to carry out the following acts:
      receiving an audio signal by a microphone operatively coupled to the mobile terminal;
      processing the received audio signal, wherein the processing of the audio signal comprises converting the audio signal to a series of digital audio samples each of which has a predetermined intensity value and duration and wherein the series of digital audio samples extend over a travel time for a traversal of a span length from a span start to a span end by an object; and
      transmitting the series of digital audio samples via the wireless network to the velocity calculation unit,
      wherein the velocity calculation unit is configured to determine an approximate travel time for the traversal of the span length by the object, wherein the determination of the approximate travel time comprises:
         processing the series of digital audio samples and detecting a first shape and a second shape which respectively correspond to an approximate start time and approximate end time of the traversal, wherein the detection of the first shape and/or second shape comprises detecting a digital audio sample whose intensity exceeds a predetermined threshold or a group of consecutive digital audio samples wherein the group's last digital audio sample has an intensity which exceeds the intensity of the group's first digital audio sample by a predetermined margin;
         determining the approximate travel time by determining a combined duration of the digital audio samples between the detected first shape and second shape, wherein the determination of the approximate travel time comprises determining the number and duration of digital audio samples between the detected first shape and second shape;
         determining the velocity of the object based on the span length and approximate travel time; and
         conveying information on the velocity of the object to the mobile terminal,
      wherein execution of the software program product in the mobile terminal further causes the mobile terminal to receive information on the velocity of the object and to visually and/or audibly output the velocity of the object.

10. The system according to claim 9, further comprising:
   a community maintenance device configured to register, log in and keep records of mobile terminal users as community members, wherein the record of a community member at least indicates an identity, sport and top velocity obtained by the community member; and
   an advertising device configured to select and deliver advertisements to community members, wherein said selection of advertisements is based at least on the respective sport of the community member.

11. The system according to claim 10, wherein the community maintenance device comprises:
   a registering device configured to register and log in a plurality of trusted users;
   a receiving device configured to receive a confirmation from one or more trusted user in respect of a velocity attained by a community member;
   a displaying device configured to display velocities attained by community members to other community members; and
   a indicating device configured to indicate whether a velocity attained by a community member has been confirmed by at least one trusted community member.

12. The system according to claim 9, wherein the software program product stored in the memory is a downloadable software program product.

13. The system according to claim 9, wherein the velocity calculation unit is located in the mobile terminal.

14. The system according to claim 9, wherein the velocity calculation unit is located in a server external to the mobile terminal.

15. The system according to claim 9, wherein the velocity calculation unit is configured to detect the first shape and the second shape among the series of digital audio samples.

* * * * *